US012762199B2

(12) United States Patent
Bannister

(10) Patent No.: US 12,762,199 B2
(45) Date of Patent: Oct. 13, 2026

(54) SYSTEMS AND METHODS FOR LOADING WEBPAGES

(71) Applicant: Canva Pty Ltd, Surry Hills (AU)

(72) Inventor: Adrian Bannister, Sydney (AU)

(73) Assignee: Canva Pty Ltd, Surry Hills (AU)

( * ) Notice: Subject to any disclaimer, the term of this patent is extended or adjusted under 35 U.S.C. 154(b) by 15 days.

(21) Appl. No.: 19/078,509

(22) Filed: Mar. 13, 2025

(65) Prior Publication Data

US 2025/0291869 A1 Sep. 18, 2025

(30) Foreign Application Priority Data

Mar. 13, 2024 (AU) ................................ 2024201646

(51) Int. Cl.
*G06F 16/958* (2019.01)
*G06F 16/955* (2019.01)

(52) U.S. Cl.
CPC .......... *G06F 16/958* (2019.01); *G06F 16/955* (2019.01)

(58) Field of Classification Search
CPC ............................. G06F 16/958; G06F 16/955
See application file for complete search history.

(56) References Cited

U.S. PATENT DOCUMENTS 11,360,976 B2 6/2022 Brantner et al.
2013/0007228 A1* 1/2013 Sherman ............... G06F 16/958 709/219
2013/0283258 A1 10/2013 Dube et al.
2019/0132418 A1* 5/2019 Zhuo ...................... G06Q 10/02
2019/0173873 A1* 6/2019 Brown ................ H04L 63/0823
2019/0179620 A1 6/2019 Lowery et al.
2019/0266227 A1* 8/2019 Kirn .................... G06F 16/9574
2020/0150939 A1 5/2020 Strimpel

* cited by examiner

*Primary Examiner* — Daniel Samwel
(74) *Attorney, Agent, or Firm* — GrowIP Law Group LLC

(57) ABSTRACT

Described herein is a computer implemented method. The method includes receiving a plurality of requests for separable computer program units (SCPUs) from a first computer program, the plurality of requests including at least a first request for a first SCPU and a second request for a second SCPU. In response to determining that the first request and the second request are to be combined, a combined SCPU request is generated based on the first request and the second request. The combined SCPU request is sent to a remote server and in response a combined SCPU response that includes at least the first SCPU and the second SCPU is received. The first SCPU and the second SCPU are provided to the first computer program.

20 Claims, 6 Drawing Sheets

SYSTEMS AND METHODS FOR LOADING WEBPAGES

CROSS-REFERENCE TO RELATED APPLICATION

This application is a U.S. Non-Provisional Application that claims priority to Australian Patent Application No. 2024201646, filed Mar. 13, 2024, which is hereby incorporated by reference in its entirety.

FIELD

The present disclosure is directed to systems and methods for loading webpages.

BACKGROUND

Webpages in the contemporary digital environment are rarely static entities. Webpage loading typically starts with an initial request that is sent to a web server. This initial request may be from a web application (such as a web browser or other application configured to user HTTP or other web protocols) to a web server. In response, and depending on the webpage requested, the web server sends one or more initial code chunks back to the web application. Execution of such initial code chunks by the web application, either alone or together with user input, can then necessitate on-the-fly retrieval and execution of supplementary code chunks.

One of the most prevalent types of these supplementary code chunks is JavaScript (JS) code chunks, which allow for enhanced interactivity, complex functionalities, and an overall enriched user experience. As a user navigates through a webpage, certain user actions or page conditions can trigger requests to the server to fetch such supplementary JS codes chunks. Once downloaded, the browser executes these codes chunks, seamlessly integrating their effects into the ongoing user experience.

Such dynamic downloading and execution paradigm is intended to improve the efficiency of websites by only downloading the minimal essential content initially and retrieving additional resources as required, which may lead to optimising both performance and bandwidth consumption.

Code chunks, or simply chunks, often include a plurality of what will be referred to as separable computer program units (SCPUs) that have been bundled together. In the context of the present specification, an SCPU refers to a distinct set of code or a component within a larger system that serves a specific function or purpose. A computer program module (or component) is an example of an SCPU. In web development, modules can represent features, functionalities, or even libraries, allowing software developers to maintain organised, reusable, and maintainable code by segmenting it into manageable pieces.

Bundling several SCPUs into a single chunk is traditionally performed at build-time. That is, as part of the software development process when source code is compiled (or transformed, in the case of some web technologies) into executable or deployable files before runtime (i.e., when the software is actively being executed or run by end-users). Build-time may involve other processes like code bundling, code minification (i.e., reducing the size of a code file by removing unnecessary characters and other techniques without altering the file's functionality), and other and/or similar processes.

By way of example, and in relation to web technologies, at build-time JavaScript code may be transformed using tools such as Webpack. Webpack may create chunks and otherwise optimise and/or transform the code (e.g., by minifying it) to make it ready for deployment and execution.

When chunks are being created at build-time, a determination may be made to identify which SCPUs are to be bundled together into a single chunk. Such determination may involve a range of strategies such as analysing static dependencies between SCPUs, creating common chunks, chunk size optimisation, manual rules specified by software developers, and other heuristic or rule-based strategies.

By way of example, at build-time a tool (e.g., Webpack or Rollup) may traverse the dependency graph of a software application. Such a graph showcases how different SCPUs (e.g., modules) depend on each other. SCPUs that are statically dependent on one another may be considered as prime candidates for being bundled into the same chunk. To illustrate this, FIG. 1 depicts a collection of SCPUs (which may, for example, be JavaScript modules) $\{M_A, M_B, M_C, M_D, M_E, M_F, M_G\}$ that have been grouped together into three chunks: $C_1=\{M_A, M_B, M_C\}$, $C_2=\{M_C, M_D, M_E\}$, and $C_3=\{M_E, M_F, M_G\}$.

A further determination may be made at build-time based on whether multiple code chunks (e.g., chunks $C_{1-3}$) contain the same SCPUs. If so, common SCPUs may be moved into a separate code chunk. Continuing with the chunks $C_{1-3}$ described above, and as shown in FIG. 2, this may result in two new common chunks being created: $CC_1=\{M_C\}$ and $CC_2=\{M_E\}$. With the creation of these new common chunks, SCPU $M_C$ is removed from chunks $C_1$ and $C_2$ and chunks $C_1$ and $C_2$ are made dependent on common chunk $CC_1$. Similarly, SCPU $M_E$ is removed from chunks $C_2$ and $C_3$ and chunks $C_2$ and $C_3$ are made dependent on common chunk $CC_2$.

Yet a further determination may then be made at build-time based on a desirable file size for each chunk (e.g., 20 kb or an alternative size). Smaller chunk files are then combined to meet that desirable file size. Continuing with the common chunks $CC_{1-2}$ described above, and as shown in FIG. 3, $CC_1$ and $CC_2$ may be merged to create a new chunk file that meets the desirable file size. Following such a merge, chunks $C_{1-3}$ are made dependent on common chunk $CC_3$ (instead of common chunks $CC_{1-2}$ which may be discarded).

Regardless of the variety and complexity of strategies observed for creating code chunks, the process of creating such chunks at build-time is blind to the actual usage of such chunks at runtime. In other words, at build-time there is no indication available to be observed with regards to the SCPUs that an end-user will actually require at runtime to complete the tasks he/she desires.

Such lack of information at build-time may result in inefficiencies in downloading and executing the required chunks at runtime. By way of example, in the examples described above chunks $C_{1-3}$ are made dependent on $CC_3$ (as shown in diagram 4420) at build-time. Consider, however, a run-time scenario in which a webpage only requires a subset of features that correspond to modules $\{M_A, M_B, M_C\}$ (i.e., original chunk $C_1$). In this case, the webpage must retrieve common chunk $CC_3$ in order to access module $M_C$. However, downloading $CC_3$ also forces retrieval of module $M_E$, even though this is not required.

Reference to any prior art in the specification is not an acknowledgement or suggestion that this prior art forms part of the common general knowledge in any jurisdiction or that this prior art could reasonably be expected to be combined with any other piece of prior art by a skilled person in the art.

SUMMARY

Described herein is a computer implemented method including: receiving a plurality of requests for separable computer program units (SCPUs) from a first computer program, wherein the plurality of requests includes at least: a first request for a first SCPU, and a second request for a second SCPU; determining that the first request and the second request are to be combined; in response to determining that the first request and the second request are to be combined: generating a combined SCPU request based on the first request and the second request; sending the combined SCPU request to a remote server; receiving, in response to the combined SCPU request, a combined SCPU response, wherein the combined SCPU response includes at least the first SCPU and the second SCPU; and providing the first SCPU and the second SCPU to the first computer program.

BRIEF DESCRIPTION OF THE DRAWINGS

Preferred embodiments of the invention will be described, by way of examples only, with reference to the accompanying representations, wherein.

Figure 1:
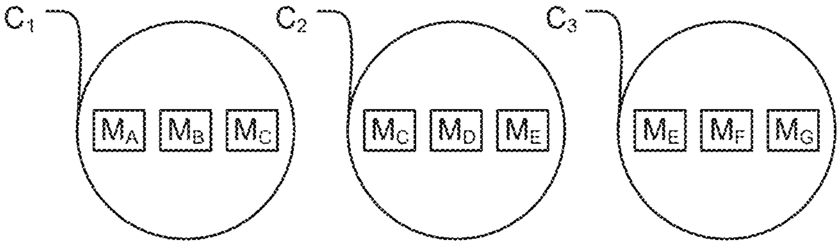
FIGS. 1 to 3 provide block diagrams depicting examples of existing build-time techniques for creating and merging code chunks.
Figure 2:
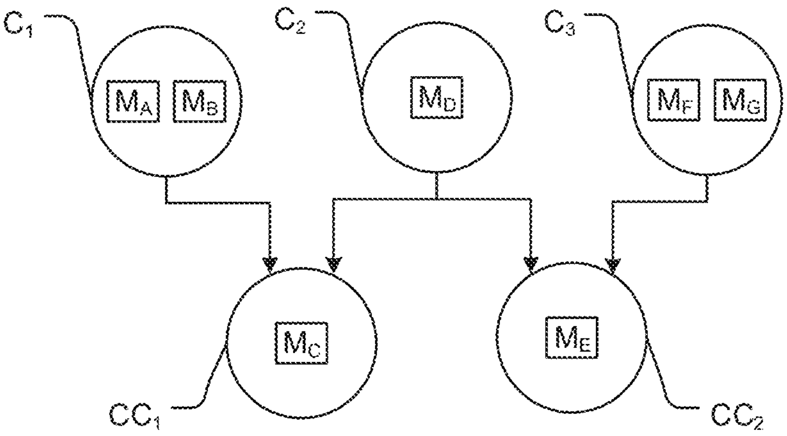
Figure 3:
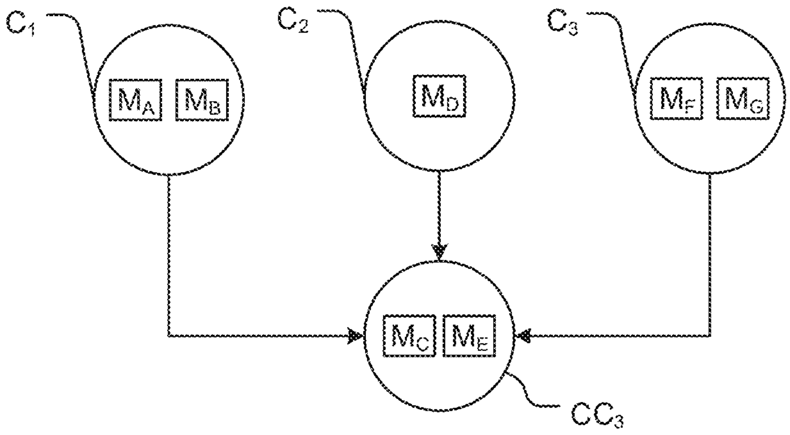

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION OF THE EMBODIMENTS

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

The present disclosure is generally concerned with loading webpages.

In particular, the present disclosure describes what will be referred to as dynamic chunk hosting (DCH). Generally speaking, DCH involves configuring client-side applications to dynamically generate combined SCPU requests and configuring server-side applications to process and respond to such requests.

For example, and as described above, during execution a web application may require and make individual requests for specific SCPUs. These individual SCPU requests are processed (e.g. by a DCH client application) to generate a combined SCPU request which is communicated to a server-side application (e.g. a DCH server application). The server-side application processes the combined SCPU request to identify the specific SCPUs that are required and to retrieve those specific SCPUs from data storage. The server-side application then generates a combined SCPU response (which may also be referred to as a dynamic chunk) that includes the specific SCPUs. The combined SPCU response is communicated to the client (e.g. to the DCH client application) where it is processed to integrate the specific SCPUs that were originally requested with the requesting web application for execution.

In some cases, the SCPUs that are retrieved may include sourcemap references—e.g. references to sourcemap files which may be used to track and/or debug source code that has been minified or otherwise transformed. In this case, and in certain embodiments, when the server-side application generates a combined SCPU response it processes each specific SCPU that has been retrieved to remove the existing sourcemap reference. The server-side application then uses those original sourcemap references to generate a combined sourcemap reference that includes (or allows identification of) the sourcemap files indicated by the original sourcemap references. The combined sourcemap reference is then included in the combined SCPU response and can be processed by a relevant client application to identify and retrieve the sourcemap files that correspond to the SCPUs. These server- and client-side steps are herein referred to as dynamic sourcemap hosting.

In the following, an example systems architecture is described followed by an example computer processing system which can be configured to perform the features described herein. Following this, example client and server applications for dynamic chunk hosting and dynamic sourcemap hosting are described. This is followed by describing various methods involved in dynamic chunk hosting and dynamic sourcemap hosting.

System Architecture

The techniques disclosed herein are described in the context of a web application. This may, for example, be executed by a web browser. This disclosure is not concerned with the type of service provided by a web application, and the techniques disclosed herein may be employed to improve the performance of any web application independent of the particular service it provides. As but one example, the techniques disclosed herein may be employed to improve the performance of a web application configured to provide various operations concerned with creating, editing, and sharing/publishing digital designs.

In this embodiment, a web application is described within a client-server architecture (e.g. one or more client applications and one or more server applications that interoperate to perform the described techniques). It will be appreciated that applications generally referred to in this disclosure as client or server applications may all be executed on one computer system or, alternatively on multiple and physically separate computer systems.

Figure 4:
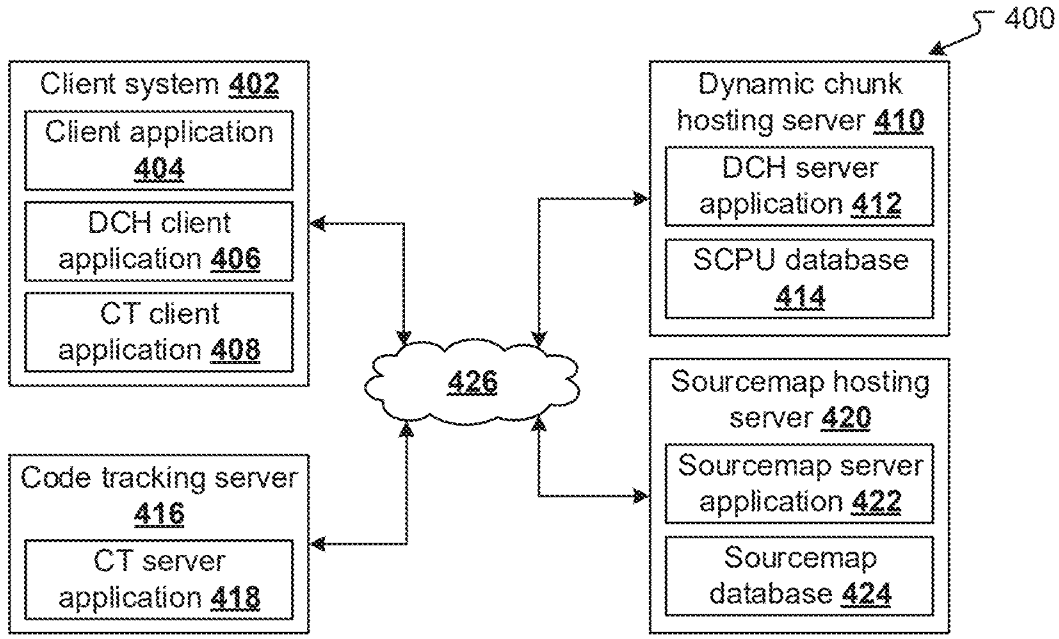
FIG. 4 is a diagram depicting a networked environment in which various features of the present disclosure may be implemented.

FIG. 4 is a diagram depicting a networked environment 400 in which various features of the present disclosure may be implemented.

Networked environment 400 includes a client system 402, a dynamic chunk hosting server 410, a code tracking server 416, and a sourcemap hosting server 420. The systems and servers shown in network environment 400 communicate via one or more communications networks 426 (e.g. the Internet).

The client system 402 and the server environments 410, 416 and 420 include computer processing hardware (discussed below). Server-side applications such as DCH server application 412, SCPU database 414, CT server application 418, sourcemap server application 422 and sourcemap database 424 generally execute on computer processing hardware of the associated server environments. The server applications (412, 414, 418, 422, and 424) provide server-side functionality to client applications such as client applications 404, 406 and 408 (described below) that execute on client system 402.

In the present embodiment, the server applications 412, 418 and 422 execute to provide client application endpoints that are accessible over communications network 426. For example, where server applications 412, 418 and 422 serve web applications, the server applications will be web servers which receive and respond (for example) to HTTP requests. Where the server applications 412, 418 and 422 serve native client applications (e.g., a code tracking environment/server not using HTTP requests), the server applications 412, 418 and 422 may be application servers configured to receive, process, and respond to specifically defined API calls received from those client applications. The server environments 410, 416 and 420 may include one or more web server applications and/or one or more application server applications allowing them to interact with both HTTP and API requests.

In the present example, the server applications 412, 418 and 422 (and/or other applications of server environment 410, 416 and 420) facilitate various functions related to improving the performance of loading and executing webpages, and tracking codes and errors for debugging web application codes. These may include, for example, downloading web code chunks, downloading sourcemap files, identifying original code corresponding to a minified code, and enabling inspecting, debugging, profiling, and optimising websites directly within the browser. Such functions may further include enabling detecting, diagnosing and fixing issues in real-time for live web applications. The server applications 412, 418 and 422 (and/or other applications) may also facilitate additional and related functions such as user account creation and management, user group creation and management, user and user group permission management, user authentication, and/or other server-side functions.

In the present example, the data storage applications 414 and 424 execute to receive and process requests to persistently store and retrieve data relevant to the operations performed/services provided by the server environments 410 and 420. Such requests may be received from the server application 412 and 422, other server environment applications, and/or (in some instances) directly from client applications such as 404, 406 and 408. Data relevant to the operations performed/services provided by the server environments 410 and 420 may include, for example, data associated with SCPUs to support the functionality of a web application (e.g., the application 404) and data associated with sourcemaps to support debugging and error tracking in a web application (e.g., the application 404), user account data, and/or other data relevant to the operation of the server environments 410 and 420.

The data storage applications 414 and 424 may, for example, be relational database management applications or alternative applications for storing and retrieving data from a data storage (not shown). Such a data storage may be any appropriate data storage device (or set of devices), for example one or more non-transitory computer readable storage devices such as hard disks, solid state drives, tape drives, or alternative computer readable storage devices.

In server environments 410 and 420, server applications 412 and 422 may persistently store data to data a storage device via the data storage applications 414 and 424. In alternative implementations, however, the server applications 412 and 422 may be configured to directly interact with data storage devices to store and retrieve data (in which case a separate data storage application may not be needed). Furthermore, while a single data storage application 414 and 424 is described in relation to each server environment 410 and 420 and no data storage application is described in relation to environment 416, each environment may include one or more data storage applications and data storage. For example, one data storage application may be used for user account data, another for SCPU data, another for sourcemap data and so forth. In this case, each data storage application may interface with one or more shared data storage devices and/or one or more dedicated data storage devices, and each data storage application may receive/respond to requests from various server-side and/or client-side applications (including, for example server applications 412 and 422).

As noted, the client system 402 and the server environments 410, 416 and 420 applications run on (or are executed by) computer processing hardware. Computer processing hardware includes one or more computer processing systems 500. The precise number and nature of those systems will depend on the architecture of the client system 402 and the server environments 410, 416 and 420.

For example, in one implementation each server environment application may run on its own dedicated computer processing system. In an alternative implementation, two or more server environment applications may run on a common/shared computer processing system. In a further alternative implementation, each of server environments 410, 416 and 420 is a scalable environment in which application instances (and the computer processing hardware—i.e. the specific computer processing systems required to run those instances) are commissioned and decommissioned according to demand—e.g. in a public or private cloud-type system. In this case, each of server environments 410, 416 and 420 may simultaneously run multiple instances of each application (on one or multiple computer processing systems) as required by client demand. Where each of server environments 410, 416 and 420 is a scalable system, it will include additional applications to those illustrated and described. As one example, each of the server environments 410, 416 and 420 may include a load balancing application which operates to determine demand, direct client traffic to the appropriate server application instance 412, 418 and 422 (where multiple server applications for each of applications 412, 418 and 422 have been commissioned), trigger the commissioning of additional server environment applications (and/or computer processing systems to run those applications) if required to meet the current demand, and/or trigger the decommissioning of server environment applications (and computer processing systems) if they are not functioning correctly and/or are not required for current demand.

Communication between the applications and computer processing systems of the server environments 410, 416 and 420 may be by any appropriate means, for example direct communication or networked communication over one or more local area networks, wide area networks, and/or public networks (with a secure logical overlay, such as a VPN, if required).

As noted earlier, the client system 402 hosts client applications 404, 406 and 408 which, when executed by the client system 402, configures the client system 402 to provide client-side functionality.

The client application 404 may be a web application, executed inside a web browser (not shown), which may be downloaded from a web server (not shown). In this disclosure, the nature of features and services provided by the client application 404 is not relevant and the application 404 may represent any web application. Via the client application 404, and as discussed in detail below, a user can make use of the various techniques and features described herein.

Dynamic chunk hosting client application, or DCH client application, 406 may provide dynamic chunk downloading services to web applications executed on client system 402 (e.g., to the client application 404). For example, a web programmer may override the default chunk downloading routines provided to a web application by, e.g., WebPack, by bespoke implementations to provide dynamic chunk downloading services according to some aspects of the embodiments disclosed herein. The DCH client application 406 may also interact with dynamic chunk hosting server 410 (or, more specifically, the DCH server application 412). In one embodiment, the DCH client application 406 may be executed inside a web browser (not shown) together with the client application 404. In other embodiments, the DCH client application 406 may be executed as a separate client-side application.

Code tracking client application, or CT client application, 408 may facilitate and support code tracking services (for, e.g., debugging and error tracking) in relation to the client application 404. The CT client application 408 may also interact with code tracking server (or, more specifically, the CT server application 418). The CT client application 408 may, for example, provide client-side functionality of a code-tracker/debugger tool such as, e.g., Sentry client-side APIs that may communicate with a remote code-tracker/debugger s erver such as the code tracking server 416 (e.g., a Sentry server). In one embodiment, the CT client application 408 may be executed inside a web browser (not shown) together with the client application 404. In other embodiments, the CT client application 408 may be executed as a separate client-side application. In yet other embodiments, no code tracking service may be available and, accordingly, the CT client application 108 and the code tracking server 416 (including the CT server application 418) may not be available.

While client applications 404, 406 and 408 are depicted as separate entities in FIG. 4, it will be appreciated that the functionality of these applications may be merged into a single application or further separated between more applications.

Figure 5:
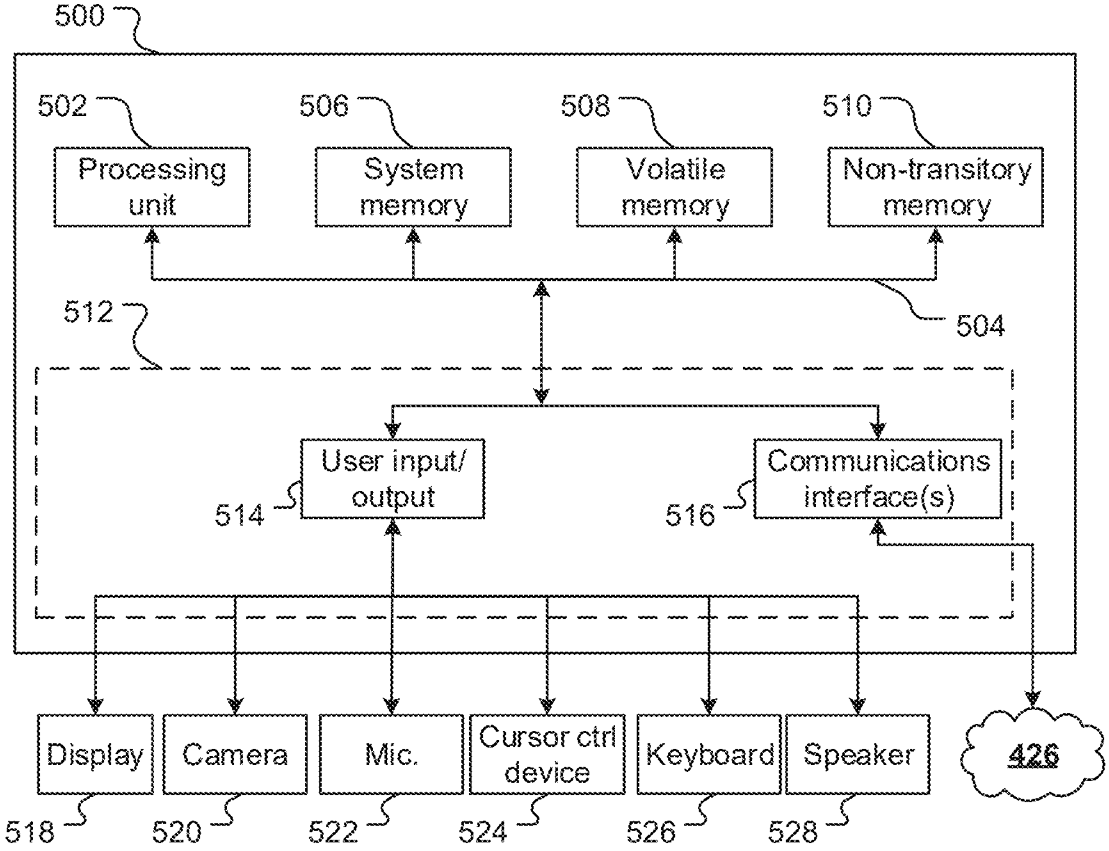
FIG. 5 is a block diagram of a computer processing system configurable to perform various features of the present disclosure.

Turning to FIG. 5, a block diagram depicting hardware components of a computer processing system 500 is provided. The computer processing systems associated with client system 402, and server environments 410, 416 and 420 may be computer processing systems such as 500 (though alternative hardware architectures are possible).

Computer processing system 500 includes at least one processing unit 502. The processing unit 502 may be a single computer processing device (e.g. a central processing unit, graphics processing unit, or other computational device), or may include a plurality of computer processing devices. In some instances, where a computer processing system 500 is described as performing an operation or function all processing required to perform that operation or function will be performed by processing unit 502. In other instances, processing required to perform that operation or function may also be performed by remote processing devices accessible to and useable by (either in a shared or dedicated manner) system 500.

Through a communications bus 504 the processing unit 502 is in data communication with a one or more machine readable storage devices (also referred to as memory devices). Computer readable instructions and/or data which are executed by the processing unit 502 to control operation of the processing system 500 are stored on one more such storage devices. In this example system 500 includes a system memory 506 (e.g., a BIOS), volatile memory 508 (e.g., random access memory such as one or more DRAM modules), and non-transitory memory 510 (e.g., one or more hard disk or solid state drives).

System 500 also includes one or more interfaces, indicated generally by 512, via which system 500 interfaces with various devices and/or networks. Generally speaking, other devices may be integral with system 500, or may be separate. Where a device is separate from system 500, connection between the device and system 500 may be via wired or wireless hardware and communication protocols, and may be a direct or an indirect (e.g. networked) connection.

Generally speaking, and depending on the particular system in question, devices to which system 500 connects-whether by wired or wireless means-include input and/or output devices (indicated generally at 514) to allow data to be input into/received by system 500 and data to be output by system 500.

By way of example, where system 500 is a personal computing device such as a desktop or laptop device, it may include a display 518 (which may be a touch screen display and as such operate as both an input and output device), a camera device 520, a microphone device 522 (which may be integrated with the camera device), a cursor control device 524 (e.g. a mouse, trackpad, or other cursor control device), a keyboard 526, and a speaker device 528.

As another example, where system 500 is a portable personal computing device such as a smart phone or tablet it may include a touchscreen display 518, a camera device 520, a microphone device 522, and a speaker device 528.

As another example, where system 500 is a server computing device, it may be remotely operable from another computing device via a communication network. Such a server may not itself need/require further peripherals such as a display, keyboard, cursor control device etc. (though may nonetheless be connectable to such devices via appropriate ports).

Alternative types of computer processing systems, with additional/alternative input and output devices, are possible.

System 500 also includes one or more communications interfaces 516 for communication with a network, such as network 426 of FIG. 4. Via the communications interface(s) 516, system 500 can communicate data to and receive data from networked systems and/or devices.

System 500 stores or has access to computer applications (also referred to as software or programs)—i.e., computer readable instructions and data which, when executed by the processing unit 502, configure system 500 to receive, process, and output data. Instructions and data can be stored on machine readable medium such as 510 accessible to system 500. Instructions and data may be transmitted to/received by system 500 via a data signal in a transmission channel enabled (for example) by a wired or wireless network connection over an interface such as communications interface 516.

Typically, one application accessible to system 500 will be an operating system application. In addition, system 500 will store or have access to applications which, when executed by the processing unit 502, configure system 500 to perform various computer-implemented processing operations described herein. For example, in FIG. 4 computer processing system 402 (which may be or include the hardware components of computer processing system 500) includes and executes application 404.

In some cases part or all of a given computer-implemented method will be performed by system 500 itself, while in other cases processing may be performed by other devices in data communication with system 500.

It will be appreciated that FIG. 5 does not illustrate all functional or physical components of a computer processing system. For example, no power supply or power supply interface has been depicted, however system 500 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Figure 6:
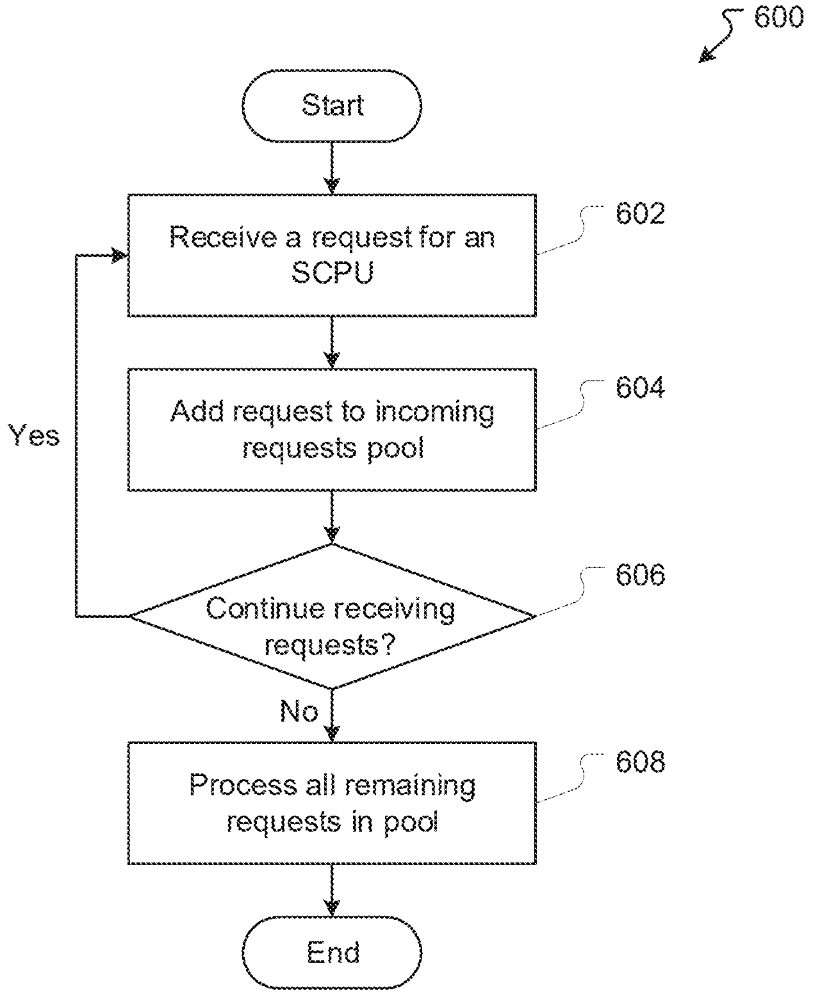
FIG. 6 depicts client-side operations performed when receiving requests for SCPUs.

Turning to FIG. 6, a computer implemented method 600 for receiving and storing requests for individual SCPUs will be described. The operation of method 600 will be described as being performed by the DCH client application 406 running on computer processing system 402. In alternative embodiments, however, the processing described may be performed by one or more alternative applications running on client system 402 and/or other computer processing systems.

At step 602, application 406 receives a request for an SCPU. The application 406 may receive such a request, for example, from the client application 404 running on the client system 402. The client application 404 may, for example, send such a request on execution of a webpage that, as part of its execution, requires additional SCPUs.

Alternatively, client application 404 and the DCH client application 406 may be merged into a single combined application. In this case, receiving a request for an SCPU at step 602 by application 406 may correspond to an internal module of such a combined application (corresponding to the application 406) receiving a request for an SCPU from another internal module of such a combined application (corresponding to the application 404).

At step 604, application 406 adds the received SCPU request to an incoming SCPU requests pool. The SCPU requests added to the incoming SCPU requests pool are processed as described in relation to method 700 of FIG. 7.

At step 606, application 406 determines if it should await receiving any further requests. The application 406 makes such determination based on whether it has received any instructions to terminate (e.g., when user input instructing the application 406 to terminate is received or when the system 402 is shutting down). If further requests are to be awaited (i.e., the application 406 should continue its operation), the application 406 transfers control to step 602 to receive another SCPU request. If further requests may not be expected (e.g., if the application 406 is instructed to terminate), the application 406 may transfer the control to step 608.

At step 608, application 406 processes any requests that remain in the incoming requests pool before application 406 terminates and the process 600 completes. In the present embodiment, application 406 discards any requests remaining in the incoming requests pool at 608.

Figure 7:
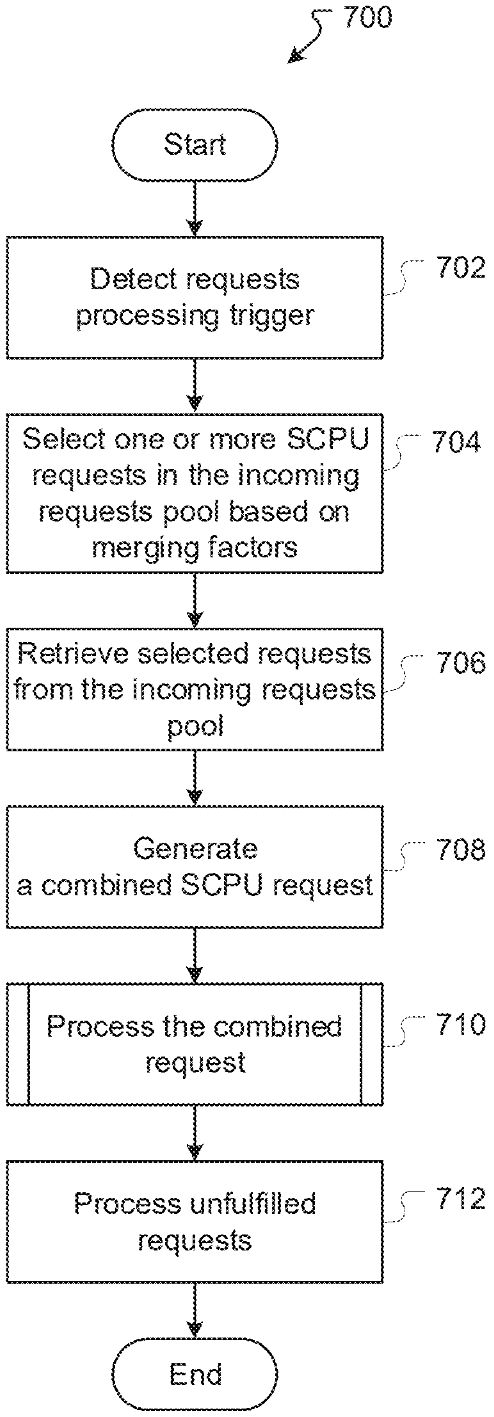
FIG. 7 depicts client-side operations performed when generating and processing combined SCPU requests.

Turning to FIG. 7, a computer implemented method 700 for processing requests for individual SCPUs that have been received will be described. The operation of method 700 will be described as being performed by the DCH client application 406 running on computer processing system 402. In alternative embodiments, however, the processing described may be performed by one or more alternative applications running on system 402 and/or other computer processing systems.

At step 702, application 406 detects a request processing trigger. There may be various request processing triggers.

As one example, a request processing trigger may arise as the result of a timer expiring. For example, it may be desirable that process 700 is triggered at certain time intervals (e.g., every 5 milliseconds). As another example, a request processing trigger may arise when a new SCPU request is added to the incoming requests pool (at step 604 of method 600). As a further example, a request processing trigger may arise as the result of the number of requests residing in the incoming requests pool reaching (or exceeding) a predefined threshold. It will be appreciated that other types of request processing triggers and/or a combination of various such triggers are possible.

At step 704, application 406 selects one or more SCPU requests residing in the incoming requests pool based on a combination of merging factors.

An example of such merging factors may be an event-based factor. For example, it may be determined that a maximum number of SCPU requests may be aggregated into a combined SCPU request. Accordingly, an event may be triggered every time that the number of requests in the incoming request pool becomes equal or greater than a specific predetermined threshold. By way of specific example, the maximum number of SCPU requests that can be combined in a combined SCPU request may be 40. The maximum number may, however, be adapted to improve or optimise performance. Accordingly, at step 704 a number of SCPU requests up to a predetermined maximum number may be selected.

Another example of such merging factors may be a time-based factor. For example, a specific time period may be determined during which all SCPU requests are aggregated into a combined SCPU request. For example, it may be determined that all SCPU requests received in the last 10 milliseconds may be aggregated into a single combined request.

A time-based merging factor may be applied alongside a maximum number event merging factor—e.g. so that up to x SCPU requests received in the last y milliseconds are aggregated into a combined SCPU request. If >x SCPU requests have been received in last y milliseconds, at step 704 the first x requests may be selected from the pool.

In certain embodiments, application 406 may be configured to observe no merging factors at step 704 and, instead, select all requests residing in the incoming requests pool.

At step 706, application 406 retrieves the requests selected at step 704 from the incoming requests pool.

At step 708, application 406 generates a combined SCPU request based on the selected SCPU requests retrieved at step 706.

At step 710, application 406 processes the combined SCPU request generated at step 708. A method for processing such requests is described below in relation to FIG. 8.

At step 712, application 406 processes any individual SCPU requests that are unfulfilled following the processing of the combined SCPU request performed at 710.

An individual SCPU request may remain unfulfilled at step 710 for a variety of reasons. For example, application 406 may fail to send a combined SCPU request to the dynamic chunk hosting server 410 (i.e., failure in step 802 described below). As another example, the dynamic chunk hosting server 410 may fail to process a combined SCPU request (e.g., a failure in executing method 900 described below). It will be appreciated that other scenarios where a combined SCPU request is not fulfilled (or not completely fulfilled) at step 710 are possible.

Figure 8:
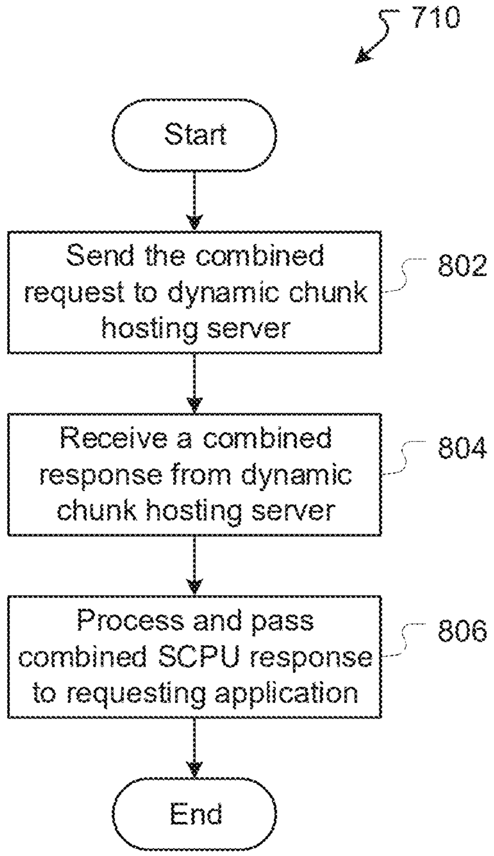
FIG. 8 depicts client-side operations performed for processing combined SCPU requests.

Turning to FIG. 8, a computer implemented method 710 for processing a combined request for multiple SCPUs at the client side will be described. The operation of method 710 will be described as being performed by the DCH client application 406 running on computer processing system 402. In alternative embodiments, however, the processing described may be performed by one or more alternative applications running on system 402 and/or other computer processing systems.

At step 802, application 406 sends the combined SCPU request to a dynamic chunk hosting server (such as dynamic chunk hosting server 410). Processing a combined SCPU request received at a dynamic chunk hosting server is described below in relation to method 900 of FIG. 9.

Figure 9:
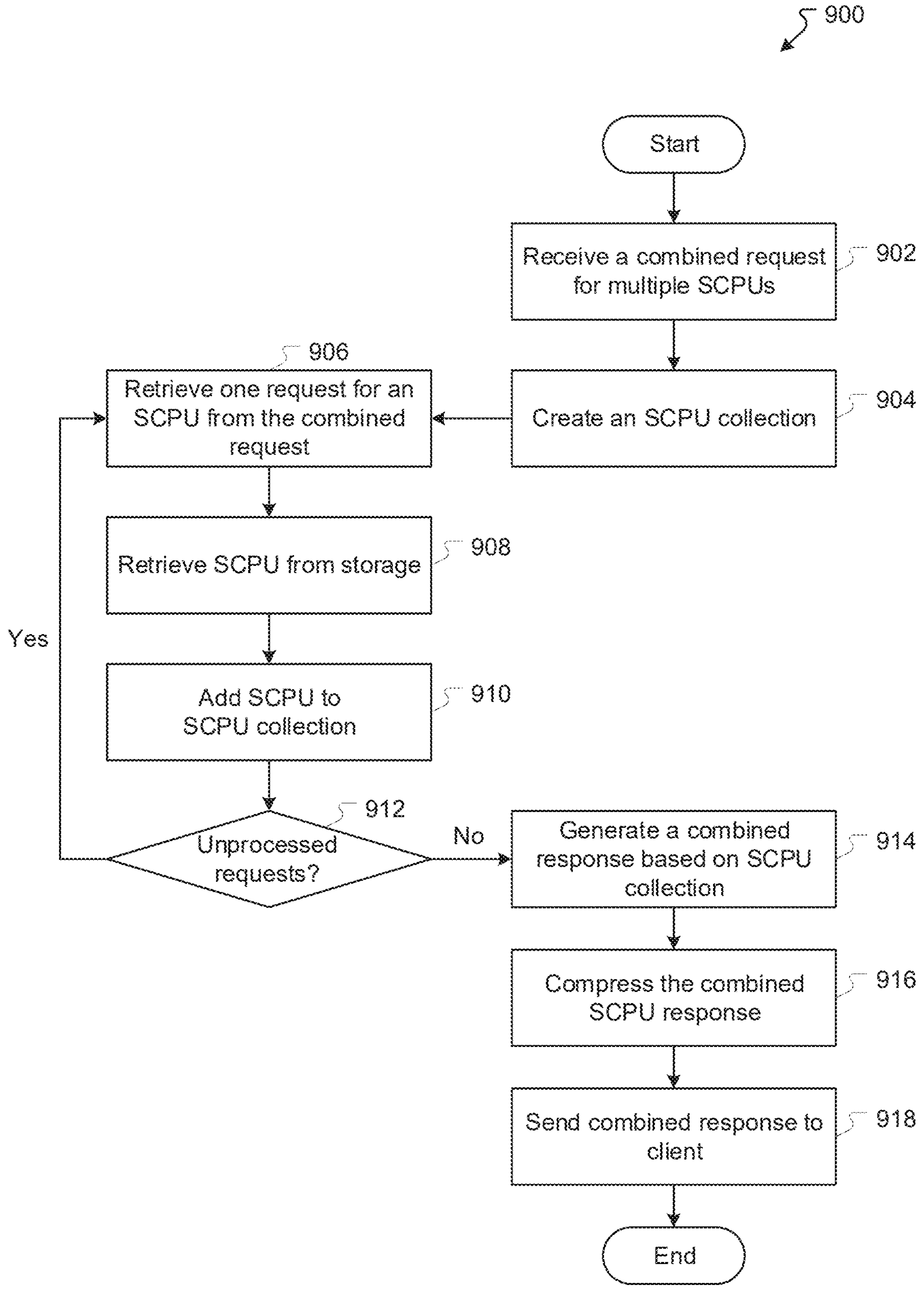
FIG. 9 depicts server-side operations performed for processing combined SCPU requests.

Turning to FIG. 9, a computer implemented method 900 for processing a combined SCPU request at server side will be described. The operation of method 900 will be described as being performed by the DCH server application 412 running on the computer processing system 410. In alternative embodiments, however, the processing described may be performed by one or more alternative applications running on the system 410 and/or other computer processing systems.

At step 902, the DCH server application 412 receives a combined SCPU request for multiple SCPUs. Such a combined request is, for example, received from a DCH client application such as the DCH client application 406 (as shown in step 802 of method 800 of FIG. 8).

At step 904, the DCH server application 412 creates an empty SCPU collection. The application 412 uses the SCPU collection to store the SCPUs retrieved in response to the requests included in the received combined SCPU request as described below.

At step 906, the DCH server application 412 processes the combined SCPU request received at step 902 to extract a next request for an SCPU.

At step 908, the DCH server application 412 retrieves the SCPU corresponding to the request extracted at step 906. The application 412 may retrieve the SCPU from, for example, the SCPU database 414 (or any other appropriate data storage device or system). For example, at step 908 the application 412 may retrieve an SCPU such as a Java Script module.

At step 910, the DCH server application 412 adds the SCPU retrieved at step 908 to the SCPU collection created at step 904.

At step 912, the DCH server application 412 determines whether there are any requests in the combined SCPU request received at 902 that have not yet been processed. If the application 412 determines that any such unprocessed requests remain, the application 412 transfers control to step 906 where the next unprocessed request will be retrieved from the combined SCPU request for processing. If, at step 912, the application 412 determines that all requests in the combined request have been processed, the application 412 transfers control to step 914.

At step 914, the DCH server application 412 generates a combined SCPU response based on the SCPU collection created at step 904 and populated at step 910. It will be appreciated that various methods may be employed for combining several SCPUs into a combined SCPU response.

In one embodiment, the method to combine the SCPUs included in the SCPU collection may involve appending the data associated with each SCPU to a single file followed by a predefined separator. Such a separator may consist of a combination of alphanumerical characters to form a unique and identifiable signature. Such a separator is later used to identify and separate the data associated with each SCPU as described in relation to step 806 of method 800.

It will be appreciated that generating a combined SCPU response based on an SCPU collection may involve additional steps. For example, and as described below, the generated combined response may be compressed for efficiency reasons.

As another example, generating a combined SCPU response may involve modifying sourcemap references. As previously described, an SCPU that has been retrieved may include a sourcemap reference. In this case, the sourcemap reference can be used by a code tracking/debugging application (e.g., Sentry, Google DevTools, or an alternative application) to retrieve a sourcemap file that is used to track/debug the code of the SCPU. In certain embodiments, where SCPUs include sourcemap files generating a combined SCPU response involves removing the sourcemap references from the SCPUs that have been retrieved at 908. The DCH server application 412 then uses the individual sourcemap references to generate a combined sourcemap reference and appends the combined sourcemap reference to the combined SCPU response.

A combined sourcemap reference may be generated using a variety of techniques and can include a range of data items associated with the SCPUs included in a combined SCPU response and the corresponding sourcemap files. The following is an example of a combined sourcemap reference:

```
https://dch-server.example.com/10__sourcemaps/sourcemap-file-
1.js.map+20__sourcemaps/sourcemap-file-
2.js.map+15__sourcemaps/sourcemap-file-3.js.map
```

In the above example, which generally conforms to a standard URL structure, the combined sourcemap reference includes various data items as follows. Firstly, the communication protocol for retrieving the corresponding sourcemap files (i.e., "https://"). Secondly, the address of the server where the sourcemap files are hosted (i.e., "dch-server.example.com"). Thirdly, a source code line identifier, which is a number identifying a first range of source code lines in a first SCPU included in a combined SCPU response (e.g., "10"). Fourthly, the address to the sourcemap file corresponding to the specified range of source code lines (i.e., "sourcemaps/sourcemap-file-1.js.map"). This is followed by two additional and similar range of source code lines and addresses to the corresponding sourcemap files. That is, "20_sourcemaps/sourcemap-file-2.js.map" indicating that the next 20 lines of code in the combined sourcemap response (i.e., lines 11 to 30) correspond to sourcemap file "sourcemaps/sourcemap-file-2.js.map"; and "15_sourcemaps/sourcemap-file-3.js.map" indicating that the next 15 lines of code in the combined sourcemap response (i.e., lines 31 to 45) correspond to sourcemap file "sourcemaps/sourcemap-file-3.js.map".

At step 916, the DCH server application 412 optionally compresses the combined SCPU response generated at 914.

At step 918, the DCH server application 412 sends the combined SCPU response generated at step 914 to a DCH client application such as the DCH client application 406.

If the DCH server application 412 fails to execute method 900 completely and accurately, one of more of the SCPU requests included in the combined SCPU request may remain unfulfilled. Such failures may occur due to a variety of reasons such as, for example, receiving a faulty combined SCPU request at step 920 (e.g., corrupted during transmission), inability to retrieve an SCPU from a storage (e.g., temporary unavailability), or an error occurring during the generation of a combined SCPU response. If a failure occurs, an appropriate error message may be generated and communicated to the DCH client application 406 which can then handle any unfulfilled requests 406 at step 710.

Returning to FIG. 8, at step 804, the DCH client application 406 receives a combined SCPU response from the DCH server application 412.

At step 806, the DCH client application 406 processes the combined SCPU response and passes it to the requesting application (e.g., to the client application 404).

The processing of the combined SCPU response may involve a number of optional steps. For example, if the combined response is compressed, the DCH client application 406 will decompress the combined response. As another example, the DCH client application 406 may create a local record indicating that the combination of certain SCPUs represented by the combined SCPU response has already been received from a remote server. Such a local record can assist in caching SCPU requests and serving such requests from cache in the future. It will be appreciated that the processing of the combined SCPU response may involve additional steps.

After the combined SCPU response is processed by the DCH client application 406, the combined response is passed to the requesting application (e.g., the application 404). This passing may involve a number of steps such as the techniques generally employed for injecting code into software applications at runtime (e.g., into the application 404).

In certain embodiments, the processing of the combined SCPU responses at step 806 may involve the DCH client application 406 generating a plurality of individual SCPUs based on the combined SCPU response. In one embodiment, generating a plurality of SCPUs involves processing the combined response to identify the predefined separators between the data of SCPUs (added at step 914 of method 900) and storing the data of each separate SCPU in a separate file. In one embodiment, a plurality of individual SCPUs generated at step 806 may be passed to the requesting application (e.g., the application 404).

Figure 10:
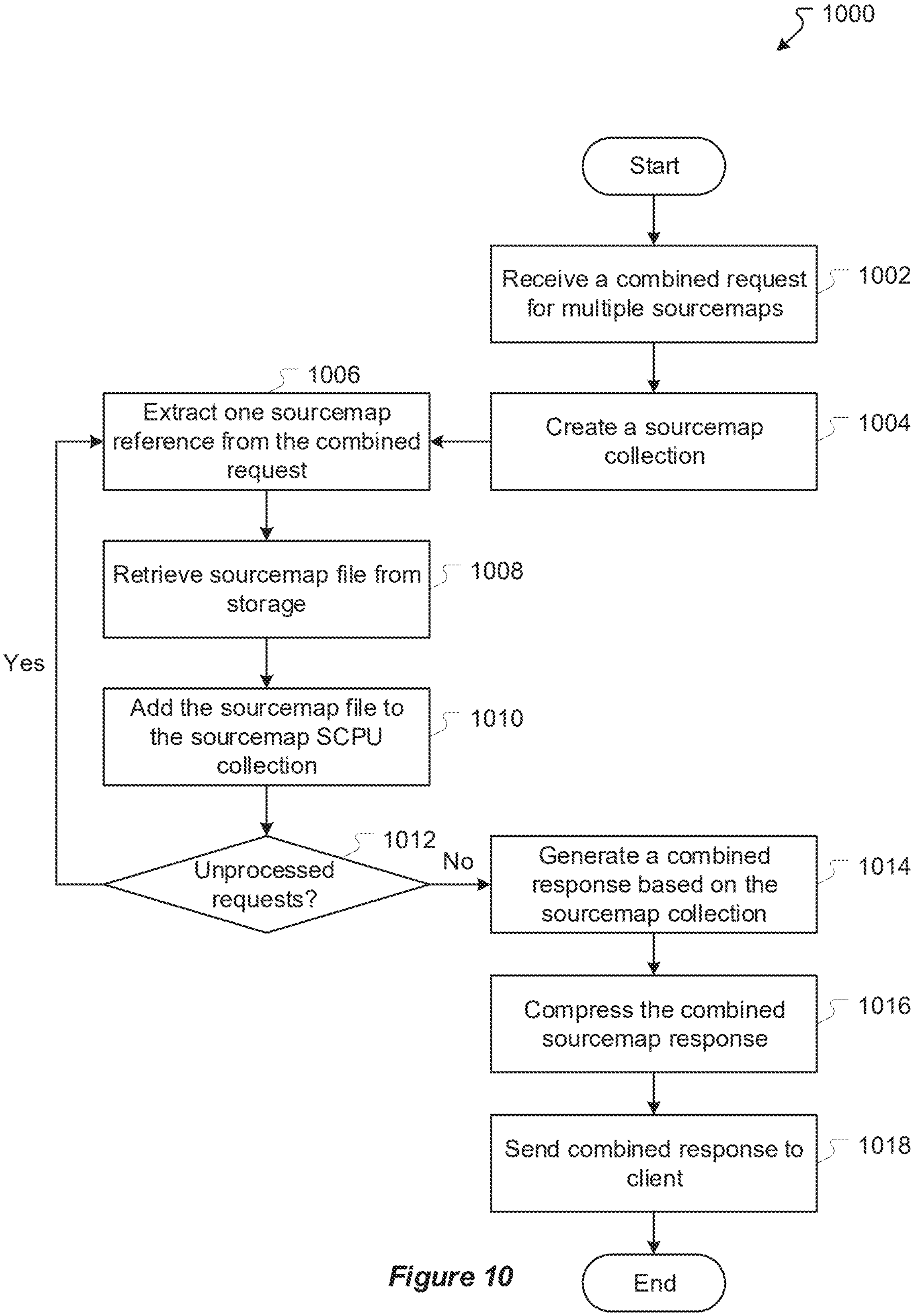
FIG. 10 depicts server-side operations performed for processing combined sourcemap requests.

Turning to FIG. 10, a computer implemented method 1000 for processing a combined sourcemap request for multiple sourcemap files at server side will be described. The operation of method 900 will be described as being performed by the sourcemap server application 422 running on computer processing system 420. In alternative embodiments, however, the processing described may be performed by one or more alternative applications running on system 420 and/or other computer processing systems.

At step 1002, the sourcemap server application 422 receives a combined sourcemap request. The combined sourcemap request includes a combined sourcemap reference which, as described above, includes data that identifies (or allows identification of) multiple sourcemap references, each sourcemap reference corresponding to a sourcemap file in respect of an SCPU.

The server application 422 may receive a combined sourcemap request from a code tracking server application (e.g., the CT server application 418), which may in turn receive such a request from a code tracking client application (e.g., the CT client application 408). In this configuration, the CT client application 408 may correspond to client-side modules of a code-tracking and/or debugging application (e.g., Sentry client-side APIs) and the CT server application 418 may correspond to server-side modules of the code-tracking and/or debugging application (e.g., a Sentry server).

Alternatively, the server application 422 may receive a combined sourcemap request from another code-tracker and/or debugger application (not shown in FIG. 1) that may execute on client system 402. In this configuration, the code-tracker and/or debugger application may correspond to application codes executed by a web browser in addition to the codes associated with the client application 404 to facilitate code-tracking and debugging services (e.g., Chrome DevTools and the associated extensions).

At step 1004, the sourcemap server application 422 creates an empty sourcemap collection. The application 422 may use the sourcemap collection to store the sourcemap files retrieved in response to the sourcemap references identified in the combined sourcemap reference (see below).

At step 1006, the sourcemap server application 422 extracts a next unprocessed sourcemap reference from the combined sourcemap reference.

At step 1008, the sourcemap server application 422 retrieves the sourcemap file corresponding to the reference extracted at step 1006. The application 422 may retrieve the sourcemap file from sourcemap database 424 (or any other appropriate data storage device or system).

At step 1010, the sourcemap server application 422 adds the sourcemap file retrieved at step 1008 to the sourcemap collection created at step 1004.

At step 1012, the sourcemap server application 422 determines if any sourcemap references in the combined sourcemap reference have not yet been processed. If the application 422 determines that any unprocessed references remain, the application 422 transfers control to step 1006 where the next unprocessed reference is retrieved for processing. If, at step 1012, the application 422 determines that all references are processed, the application 422 transfers control to step 1014.

At step 1014, the sourcemap server application 422 generates a combined sourcemap response based on the sourcemap collection created at step 1004 and populated at step 1010.

In one embodiment, the method to combine the sourcemap files included in the sourcemap collection involves appending the contents of all sourcemap files into a single combined sourcemap file. The combined sourcemap file may, for example, be formatted according to Sourcemap Revision 3 Proposal (dated 11 Feb. 2021, by John Lenz and Nick Fitzgerald), where the content of each individual sourcemap file is separated using the 'offset' tag. The following is an example of a combined sourcemap response corresponding to the example combined sourcemap reference described above:

```
{
  "version": 3,
  "sections": [
    {
      "offset": {line": 1, "column": 0},
      "map": { ... }
    },
    {
      "offset": {"line": 11, "column": 0},
      "map": { ... }
    },
      "offset": {"line": 31, "column": 0},
      "map": { ... }
    }
  ]
}
```

In the above example, the "line" attributes indicate the starting line of source code that the following sourcemap file is related to. The "map" attributes contain the contents of the corresponding sourcemap files (not shown, and replaced by " . . . ").

At step 1016, the sourcemap server application 422 optionally compresses the combined sourcemap response generated at 1014.

At step 1018, the sourcemap server application 422 sends the combined sourcemap response generated at step 1014 to the requesting party (e.g., the CT server application 418, or a code-tracker and/or debugger application running on the client system 402).

The flowcharts illustrated in the figures and described above define operations in particular orders to explain various features. In some cases, the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, operations, steps, or elements.

Unless required by context, the terms "first", "second", etc. are used to differentiate between various elements and features and not in an ordinal sense. For example, a first glyph set could be termed a second glyph set, and, similarly, a second glyph set could be termed a first glyph set, without departing from the scope of the described examples.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method including:
- receiving a plurality of requests for separable computer program units (SCPUs) from a first computer program, wherein receiving the plurality of requests includes:
  - receiving a first request for a first SCPU from the first computer program, and
  - following receipt of the first request, receiving a second request for a second SCPU from the first computer program, wherein the second request is separate to the first request;
- determining that the first request and the second request are to be combined;
- in response to determining that the first request and the second request are to be combined:
  - generating a combined SCPU request based on the first request and the second request;
  - sending the combined SCPU request to a remote server;
  - receiving, in response to the combined SCPU request, a combined SCPU response, wherein the combined SCPU response includes at least the first SCPU and the second SCPU; and
  - providing the first SCPU and the second SCPU to the first computer program.

2. The computer implemented method of claim 1, wherein the first SCPU is a first JavaScript module and the second SCPU is a second JavaScript module.

3. The computer implemented method of claim 1, wherein the first computer program is a web application.

4. The computer implemented method of claim 1, wherein determining that the first request and the second request are to be combined is based on a set of one or more merging factors.

5. The computer implemented method of claim 4, wherein the set of one or more merging factors include one or a combination of:
- a time-based merging factor; and
- an event-based merging factor.

6. The computer implemented method of claim 1, wherein the method further includes retrieving the first SCPU and the second SCPU from the combined SCPU response based on a predefined separator included in the combined SCPU response.

7. A computer implemented method including:
- receiving a combined separable computer program unit (SCPU) request from a first computer program, wherein the combined request includes at least:
  - a first request for a first SCPU, and
  - a second request for a second SCPU;
- retrieving first data that includes the first SCPU;
- retrieving second data that includes the second SCPU;
- generating a combined SCPU response that includes at least the first SCPU and the second SCPU; and
- sending the combined SCPU response to the first computer program.

8. The computer implemented method of claim 7, wherein the first SCPU is a first JavaScript module and the second SCPU is a second JavaScript module.

9. The computer implemented method of claim 7, wherein the first computer program is a web application.

10. The computer implemented method of claim 7, wherein generating the combined SCPU response includes using a predefined separator to separate the first SCPU and the second SCPU in the combined response.

11. The computer implemented method of claim 7, wherein generating the combined SCPU response further includes compressing the first SCPU and the second SCPU.

12. The computer implemented method of claim 7, wherein:

the first data includes a first sourcemap reference that is associated with the first SCPU;

the second data includes a second sourcemap reference that is associated with the second SCPU; and generating the combined SCPU response includes removing the first sourcemap reference from the first data and removing the second sourcemap reference from the second data.

13. The computer implemented method of claim 12, wherein generating the combined SCPU response further includes:

generating a combined sourcemap reference based on the first sourcemap reference and the second sourcemap reference; and including the combined sourcemap reference in the combined SCPU response.

14. The computer implemented method of claim 13, wherein the combined sourcemap reference is a URL.

15. The computer implemented method of claim 14, wherein the URL includes one or more data items, the one or more data items defining one or more of:

a communication protocol;

an address of a sourcemap server;

a source code line identifier; and a sourcemap file address.

16. A computer processing system including:

a processing unit; and non-transitory computer-readable storage media storing instructions, which when executed by the processing unit, cause the processing unit to perform a method including:

receiving a plurality of requests for separable computer program units (SCPUs) from a first computer program, wherein receiving the plurality of requests includes:

receiving a first request for a first SCPU from the first computer program, and following receipt of the first request, receiving a second request for a second SCPU from the first computer program, wherein the second request is separate to the first request;

determining that the first request and the second request are to be combined;

in response to determining that the first request and the second request are to be combined:

generating a combined SCPU request based on the first request and the second request;

sending the combined SCPU request to a remote server;

receiving, in response to the combined SCPU request, a combined SCPU response, wherein the combined SCPU response includes at least the first SCPU and the second SCPU; and providing the first SCPU and the second SCPU to the first computer program.

17. The computer processing system of claim 16, wherein the first SCPU is a first JavaScript module and the second SCPU is a second JavaScript module.

18. Non-transitory storage media storing instructions executable by a processing unit to cause the processing unit to perform a method including:

receiving a plurality of requests for separable computer program units (SCPUs) from a first computer program, wherein receiving the plurality of requests includes:

receiving a first request for a first SCPU from the first computer program, and following receipt of the first request, receiving a second request for a second SCPU from the first computer program, wherein the second request is separate to the first request;

determining that the first request and the second request are to be combined;

in response to determining that the first request and the second request are to be combined:

generating a combined SCPU request based on the first request and the second request;

sending the combined SCPU request to a remote server;

receiving, in response to the combined SCPU request, a combined SCPU response, wherein the combined SCPU response includes at least the first SCPU and the second SCPU; and providing the first SCPU and the second SCPU to the first computer program.

19. The non-transitory storage media of claim 18, wherein the first SCPU is a first JavaScript module and the second SCPU is a second JavaScript module.

20. The non-transitory storage media of claim 18, wherein the first computer program is a web application.

* * * * *